United States Patent [19]

Courteau

[11] Patent Number: 4,627,384
[45] Date of Patent: Dec. 9, 1986

[54] BIRD TREE APPARATUS

[76] Inventor: Marc A. Courteau, 7538 18th Ave., S., Richfield, Minn. 55423

[21] Appl. No.: 682,689

[22] Filed: Dec. 17, 1984

[51] Int. Cl.[4] ............................................. A01K 31/12
[52] U.S. Cl. .......................................... 119/26; 119/29
[58] Field of Search ..................... 119/26, 29, 23, 17, 119/18, 51 R

[56] References Cited

U.S. PATENT DOCUMENTS

| D. 76,406 | 9/1928 | Leon | 119/26 |
|---|---|---|---|
| D. 153,272 | 4/1949 | Forner | 119/26 |
| D. 175,292 | 8/1955 | Austgen | 119/26 |
| 276,392 | 4/1883 | Gregory | 119/26 |
| 910,298 | 1/1909 | Lindemann | 119/26 |
| 1,123,044 | 12/1914 | Warneche | 119/26 |
| 1,575,101 | 3/1926 | Edwards | 119/26 |
| 2,808,807 | 10/1957 | Winton et al. | 119/26 |
| 3,595,209 | 7/1971 | Parker | 119/29 |

*Primary Examiner*—Jay N. Eskovitz
*Attorney, Agent, or Firm*—Anthony G. Eggink

[57] ABSTRACT

A bird tree apparatus for exercising the anatomical features of domestic birds and for removably collecting food and bird droppings. The bird tree apparatus is comprised of an upright support member having upper, lower and intermediate portions. A plurality of base members are attached to the lower portion of the support member to hold it in a generally vertical position. A removable platform member for collecting bird food and droppings is removably mounted at the intermediate portion of the upright support member. A plurality of elongated perch members are attached to and extend outwardly from the upper portion of the support member. The perch members have a plurality of diameter dimensions to provide a bird with means to exercise its leg muscles and the elongated perch members are preferably of a wood dowel construction having a diameter range from 1/16 to 2 inches. The bird tree apparatus further has an upright support member and the platform member constructed of wood to provide domestic bird species with chewing and clawing members. The platform member additionally has an upright ridge member about its periphery to aid in maintaining bird food, aviary toys and droppings on the platform member and the bird tree apparatus is further provided with swing members for bird exercising and a removably mounted platform member having a locking plate to provide the user with means to easily care for the bird tree apparatus.

10 Claims, 6 Drawing Figures

U.S. Patent  Dec. 9, 1986  Sheet 1 of 2  4,627,384
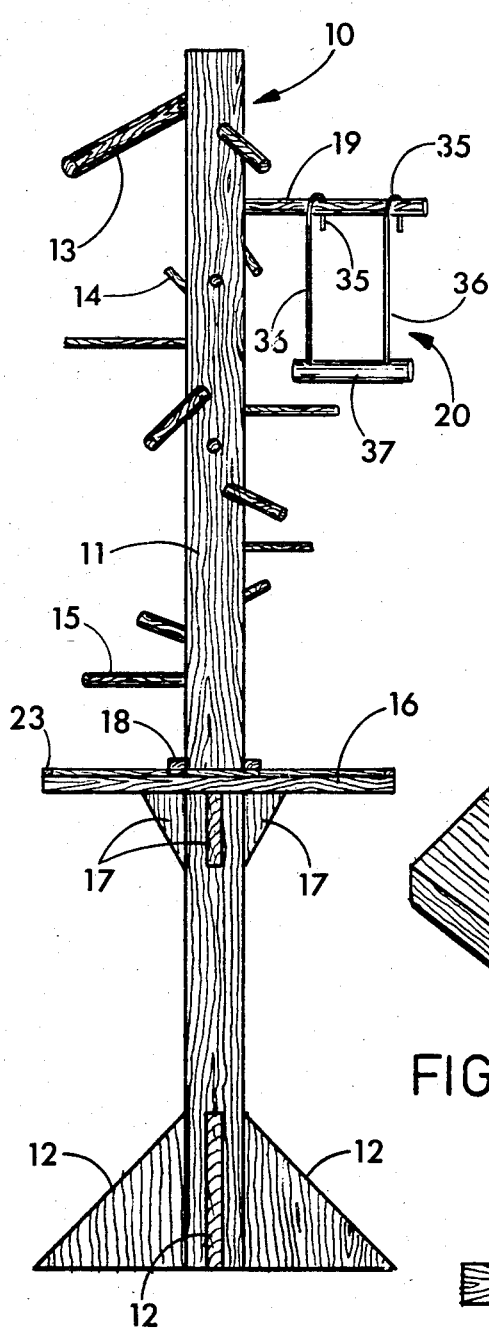
FIG. 1
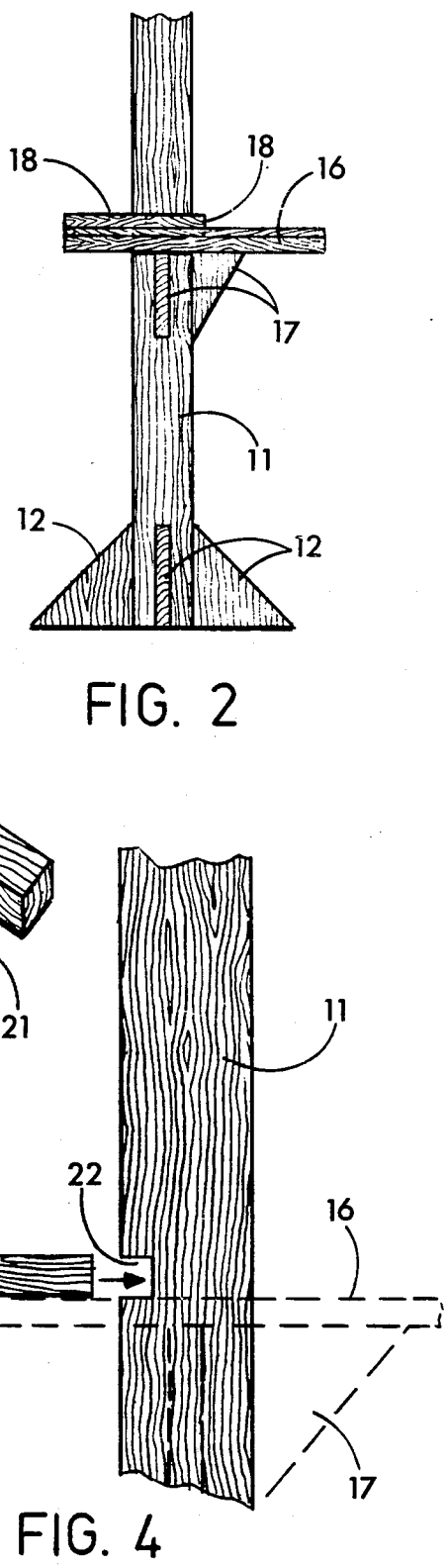
FIG. 2
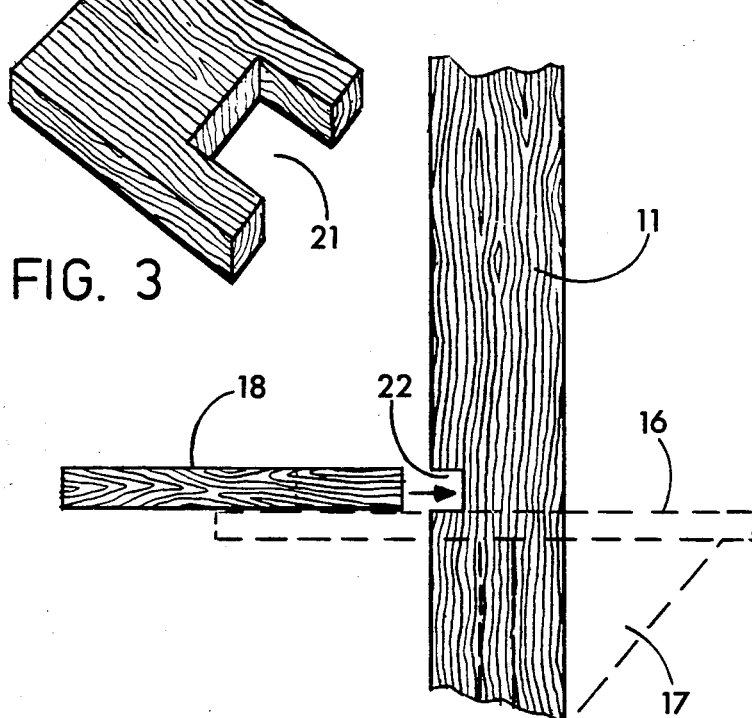
FIG. 3
FIG. 4

BIRD TREE APPARATUS

BACKGROUND OF THE INVENTION

This invention relates to a bird tree apparatus for use by domestic bird species. Particularly, this invention relates to a bird tree apparatus that is provided for indoor aviary use and which has perch members that permit birds to properly exercise their unique anatomical features, such as their legs, claws and beaks.

The bird tree apparatus of the invention is useful for providing domestic birds with assimilated natural means to perch, play and to exercise their bodies. The bird tree apparatus is especially useful for providing the birds with means to grip or hold perch members of varying diameters and angular dispositions to reduce atrophying effects on their leg and foot or claw muscles which are often the result of captivity.

Birds have unique anatomical features that are not found in other animals. For example, birds have unique muscular mechanisms which result when birds assume squatting positions for rest or sleep. In that position, certain tendons are pulled which in turn flex the toes that essentially locks the bird to its perch. And, because a bird utilizes perches of varying sizes and configurations in its natural habitat, the utilization of uniform perch members is deterimental to its muscular system, i.e., the tibia, tarsus and hallux portions of the bird leg and claw.

The bird tree apparatus of this invention provides the bird tree owner with an apparatus that permits a domestic bird with proper exercising means, as found in its natural habitat. And, the bird tree apparatus provides the bird with a wooden structure on which it can chew and claw to control the growth of its nails and beak.

The invention provides a bird tree or perch apparatus that is designed primarily for indoor use by pet birds, which permits the birds to sit, exercise and play, and which provides the owner with an apparatus that is easily maintained. The apparatus is provided in generally two embodiments, an upright floor embodiment and a table top embodiment, which are constructed and designed for economy, easy use and care.

In the past, generally simple and unsophisticated devices have been proposed or utilized for use by domestic birds. However, these devices have been limited in usefulness and function. And, although these prior art devices have been adequate for the perching of birds they have either been unable to be easily cleaned and maintained or they have failed to provide means for birds to adequately exercise their anatomical features to prevent muscle atrophication and to control nail and beak growth. Typical examples of these prior art perches are those provided for use within the confines of bird cages.

Generally all of the perch members in these devices have been of a uniform thickness or diameter, and, therefore, have a tendency to permit the leg and foot muscles of birds to weaken or atrophy due to the repeated requirement that the claws engage the same sized perch members.

The bird tree apparatus of this invention overcome the problems that have existed with these prior art bird perches. The apparatus of this invention has a plurality of elongated perch members of varying diameters and disposed at varying angles so that a pet bird when utilizing them is forced to extend and contract its muscles for exercise purposes.

Additionally, the apparatus is provided with a removable tray assembly for catching bird food, bird droppings, storing bird toys and to catch toys dropped from the respective perch members thereabove. And, the invention provides bird tree assemblies of various constructions which are functional, effective, simple in design and easily manufactured.

SUMMARY OF THE INVENTION

This invention provides a bird tree apparatus for exercising the anatomical parts of domestic birds, such as their legs, claws and beaks, and for removably collecting food, aviary toys and bird droppings. The bird tree apparatus is comprised of an upright support member having upper, lower and intermediate portions.

A plurality of base members are attached to the lower portion of the support member to hold it in a generally vertical position. A removable platform member for collecting bird food and droppings, as well as for storing bird toys, is removably mounted at the intermediate portion of the upright support member.

Importantly, a plurality of elongated perch members are attached to and extend outwardly from the upper portion of the support member. The elongated perch members extend from the support member at various angular dispositions. The perch members also have a plurality of diameter dimensions to provide a bird with means to properly exercise its leg and foot muscles. The elongated perch members are preferably of a wood dowel construction having a diameter range from approximately 1/16 to 2 inches.

The bird tree apparatus of the invention further has components, such as its an upright support member, platform member and perch members, that are constructed of wood to provide domestic birds with means to exercise, sharpen and control the growth of their beaks (upper and lower mandibles) and claws, i.e., hallux or hind toe.

The platform member additionally has an upright ridge member about its periphery to aid in maintaining bird food and droppings on thereon, as well as for the storage of bird toys. And, the bird tree apparatus is further provided with swing members for bird play and exercising purposes, and a removably mounted platform member having a locking plate to provide the user with means to easily clean and care for the bird tree apparatus.

These and other benefits of this invention will become clear from the following description by reference to the drawings.

BRIEF DESCRIPTION OF THE DRAWINGS

FIG. 1 is a perspective side view which shows the bird tree apparatus of this invention;

FIG. 2 is a lateral view of the bird tree apparatus of FIG. 1 showing the bottom and intermediate portions thereof;

FIG. 3 is a perspective view of the locking plate used in this invention to secure the platform member thereof;

FIG. 4 is a close-up lateral view of the intermediate portion of the bird tree apparatus showing the locking plate of FIG. 3 used to secure the removable platform member of this invention;

DESCRIPTION OF THE PREFERRED EMBODIMENTS

Figures 5, 6:
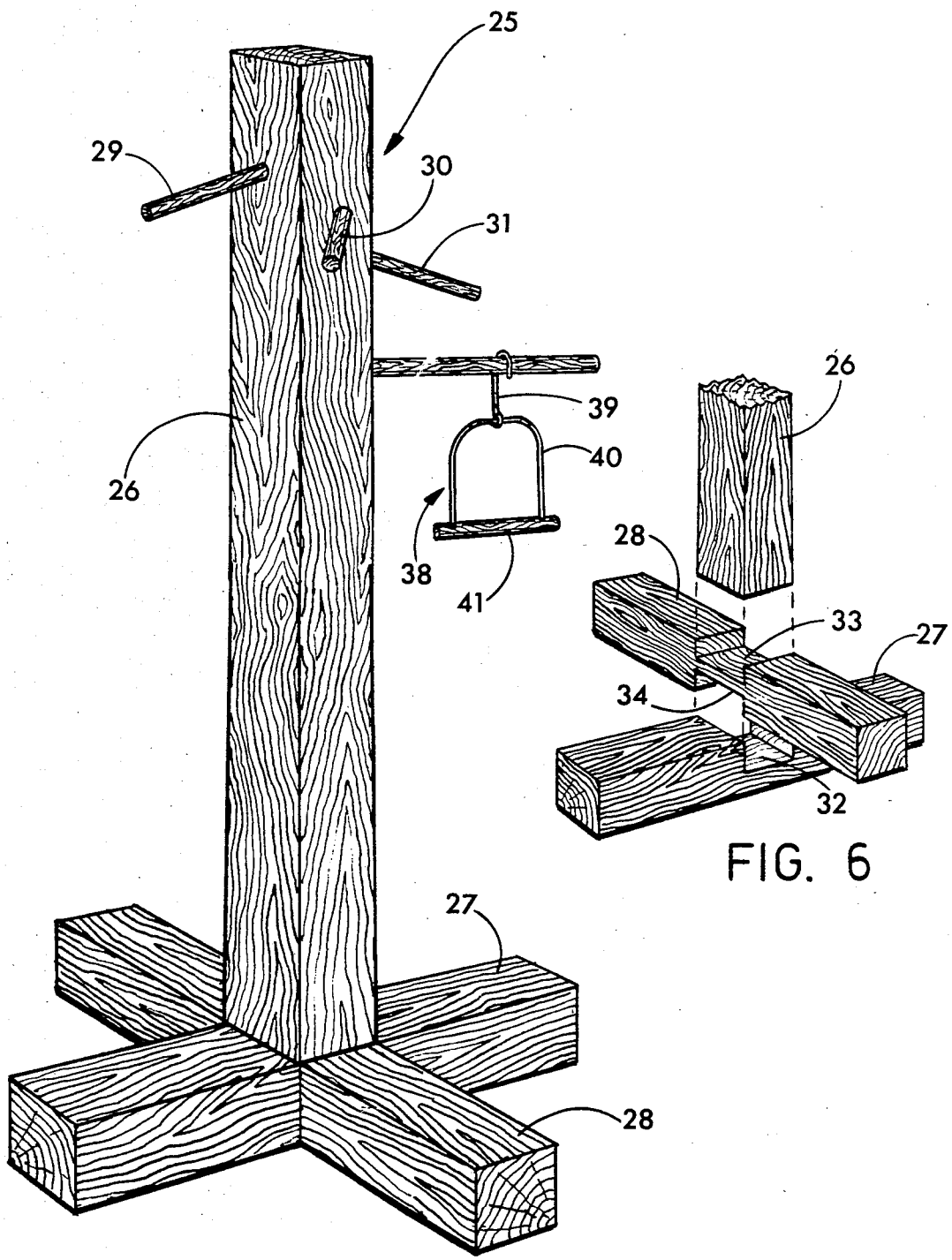
FIG. 5 is perspective view of another embodiment of the bird tree apparatus of this invention.
FIG. 6 is a perspective view of the bottom portion of the embodiment of the embodiment as shown in FIG. 5.

Referring to FIG. 1 of the drawing, the bird tree apparatus 10 of this invention is there illustrated in a perspective view. The tree apparatus 10 has an upright or vertical support member 11, shown as having a generally square cross section. For example, two to four inch square wooden post members have been found suitable for use as support members 11.

The upright support member 11 of FIG. 1 has a height of approximately 5 feet and can, obviously, be constructed of members having other than a square cross section. Four opposing base members 12 of a generally triangular configuration are shown fastened or attached to the lower portion of the support member 11. However, base members 12 of any configuration which adequately maintain the support member 11 in a stable, upright position is within the purview of this invention.

A removable platform member 16 having platform supports 17 is removably mounted at an intermediate portion of the support member 11. The platform support members 17 are shown to be of a generally triangular configuration and they are attached to the support member 11. Further, a plurality of elongated perch members 13, 14 and 15 are provided at the upper portion of the support member 11.

The perch members 13, 14 and 15 are secured by frictionally fit and/or glue into apertures in upright or vertical support member 11. The bird tree structure 10 and its components are preferably constructed of wood to enable the birds to chew on it and to give the birds better gripping and grasping means for their beaks, feet or claws. The latter, to discourage or to reduce the inclination of the birds from chewing and clawing surrounding furniture or other appliances or fixtures in the home.

Importantly, the elongated perch members 13, 14 and 15, i.e., wooden dowels, are of varying diameters and disposed at varying angles, both from the horizontal and vertical, with respect to upright 11. The varying diameters gives the birds the oppertunity to exercise the leg and foot or claw muscles. Dowel perch members having a diameter range from approximately 1/16 to 2 inches has been found adequate for the proper muscle exercise of most domestic bird species.

FIG. 1 also shows a horizontally disposed support member 19 having a swing assembly 20 depending therefrom. The swing assembly 20 has a pair of hooked ends 35 (or rings if desired) which are slipped about the perch member 19 and is easily removable therefrom for placement on a different perch member. The swing assembly 20 further is shown as having support members 36, i.e., metal, with hooked ends 35, and a generally horizontal wooden swing bar 37 is attached to the support members 36. Although other swing assembly configurations can also be utilized, as will be discussed, it is important that the swing bar be constructed of wood to engage the claws of the bird. For example portions of the support members 36 can be constructed of wood dowel material having ring portions at its ends to engage a perch member.

The removable platform member 16 is for catching food and droppings and to hold bird toys, etc. and it is removable for cleaning as shown in FIGS. 2, 3 and 4 by means of a locking member 18, which frictionally locks into notch 22 of the upright support member 11 by means of a slot 21 in locking member 18. Additionally, the horizontally disposed platform or shelf 16 has an edge 23 about its periphery to prevent objects, such as toys and droppings from falling off the edge of the platform member 16.

In use, as shown particularly in FIGS. 3 and 4, the locking member 18 can be removed from above the platform 16 so that the platform is free to be moved from the tree apparatus for cleaning purposes. Subsequently, the platform 16, having an elongated notch therein to receive the upright 11 is slid back into position. The placement of the locking member 18 between the platform 16 and the interior of notch 22 in the upright 11 secures the platform. The locking member 18 preferably has a width and length so that when in a locked position it covers the elongated notch in the platform 16.

FIG. 5 illustrates a bird tree apparatus embodiment 25 designed to function as a table top tree. The apparatus 25 is similar to tree 10, but shorter in length and without the platform. The tree 25 has an upright member 26 and base members 27 and 28 and perch members 29, 30 and 31. The perch members, importantly, are also of differing diameters and are disposed at varying angles, both from vertical and from the horizontal orientation, with respect to the upright 26.

FIG. 5 also illustrates a swing assembly 38 which is attached to a perch member by means of an attaching hook member 39. The swing assembly 38 further has pliable, i.e., metal, support structure 40 having ends that are secured to a wooden swing bar 41. For purposes of this invention, the swing assembly 38 and swing assembly 20, shown in conjunction with bird tree structure 10, are interchangeable for use.

FIG. 6 illustrates the base assembly of tree 25 as having a lower base member 27 with notch 32 and an upper base member 28 with opposing notches 33 and 34. The notches are aligned and upright 26 is secured into the base assembly by fitting into the upwardly extending notch 33 of the upper base member 28 to yield the flush assembly shown in FIG. 5.

The base assembly shown in FIG. 5 has been found suited for the smaller table top embodiment of the bird tree apparatus, although it could be utilized on the larger upright embodiment illustrated in FIGS. 1 and 2. However, for proper balance and stability purposes, the utilization of opposing base support members 12 has been found better suited for the larger upright embodiment equiped with the removable platform member 16.

As many changes are possible to the embodiments of the bird tree apparatus utilizing the teachings of the invention, the descriptions above and the accompanying drawings should be interpreted in the illustrative and not in the limited sense.

That which is claimed is:

1. A bird tree apparatus for exercising the anatomical features of a domestic bird to reduce the atrophying effect on the leg and foot muscles, for removably collecting food and bird droppings, and for holding aviary toys, said bird tree apparatus comprising:

a. an upright support member having upper, lower and intermediate portions and having a predetermined width, said intermediate portion further having a horizontally disposed slot thereinto and having generally parallel top and bottom surfaces spaced a predetermined height and further having opposing platform support members each having a generally flat top surface affixed to said support member, said platform support member top surfaces being in planar communication with the bottom surface of said support member slot,
b. a plurality of outwardly extending base members attached to the lower portion of said support member to hold said support member in a generally vertical position,
c. a frictionally held and quickly removable horizontally disposed platform member having an elongated notch thereinto and extending to generally its midportion for engaging said support member, said platform member being for collecting bird food, aviary toys and droppings, said platform member being removably mountable at said horizontally disposed slot at the intermediate portion of said upright support member, and for placement on said opposing platform support members,
d. a locking plate member having a predetermined thickness approximately said predetermined support member slot height and having a width greater than said predetermined support member width, said locking plate for insertion into said support member slot and for engaging said platform member for permitting the quick removal of said platform member without disassembly of the structural elements of said device, and
e. a plurality of elongated perch members attached to and extending outwardly from said upper portion of said support member, said perch members consisting of a plurality of diameter dimensions to provide a bird with means to exercise its leg muscles by providing perch members having a plurality of claw gripping diameters, said elongated perch mambers further being of a wood dowel construction having a diameter range from 1/16 to 2 inches.

2. The bird tree apparatus of claim 1, wherein said upright support member and said platform member are of a wood construction.

3. The bird tree apparatus of claim 1, wherein said platform member additionally has an upright ridge member about its periphery to aid in maintaining bird food, aviary toys and droppings on said platform member.

4. The bird tree apparatus of claim 1, wherein one said elongated perch member has a swing member depending therefrom.

5. The bird tree apparatus of claim 1, wherein said base members are fastened to the periphery of the lower portion of said upright support member.

6. A bird tree apparatus for exercising the anatomical features of a domestic bird to reduce the atrophying effect on its leg and foot muscles and for removably collecting food, aviary toys and bird droppings, said bird tree apparatus comprising:
a. an upright support member having upper, lower and intermediate portions and having a predetermined width, said intermediate portion further having a horizontally disposed slot thereinto having generally parallel top and bottom surfaces spaced a predetermined height and having opposing platform support members each having a generally flat top surface affixed to said support member, said platform support member top surfaces being in planar communication with the bottom surface of said support member slot,
b. a plurality of outwardly extending base members attached to the lower portion of said support member to hold said support member in a generally vertical position,
c. a frictionally held and quickly removable platform member for collecting bird food, aviary toys and droppings, said platform member being removably mountable at said intermediate portion of said upright support member, said removably mounted platform member further having a slotted portion thereinto and having a locking plate member for insertion in said support member slot to removably hold said platform member on said platform support members, and
d. a plurality of elongated perch members attached to and extending outwardly from said upper portion of said support member, said perch members having a plurality of diameter dimensions to provide a bird with means to exercise its leg muscles, said elongated perch members further being of a wood dowel construction having a diameter range from 1/16 to 2 inches.

7. The bird tree apparatus of claim 6, wherein said upright support member and said platform member are of a wood construction.

8. The bird tree apparatus of claim 6, wherein said platform member additionally has an upright ridge member about its periphery to aid in maintaining bird food, aviary toys and droppings on said platform member.

9. The bird tree apparatus of claim 6, wherein one said elongated perch member has a swing member depending therefrom.

10. The bird tree apparatus of claim 6, wherein said base members are fastened to the periphery of the lower portion of said upright support member.

* * * * *